(12) United States Patent
Nishino

(10) Patent No.: US 8,794,887 B2
(45) Date of Patent: Aug. 5, 2014

(54) CLIP AND SUPPORT MEMBER

(75) Inventor: Masaaki Nishino, West Bloomfield, MI (US)

(73) Assignee: Nifco Inc., Yokohama-Shi, Kanagawa (JP)

( * ) Notice: Subject to any disclaimer, the term of this patent is extended or adjusted under 35 U.S.C. 154(b) by 875 days.

(21) Appl. No.: 12/672,607

(22) PCT Filed: Aug. 5, 2008

(86) PCT No.: PCT/JP2008/064047
§ 371 (c)(1),
(2), (4) Date: May 19, 2011

(87) PCT Pub. No.: WO2009/020122
PCT Pub. Date: Feb. 12, 2009

(65) Prior Publication Data
US 2011/0210223 A1   Sep. 1, 2011

(30) Foreign Application Priority Data

Aug. 9, 2007   (JP) ................................. 2007-207654

(51) Int. Cl.
*F16B 13/06*   (2006.01)

(52) U.S. Cl.
USPC .................... 411/45; 411/48; 24/295; 24/297

(58) Field of Classification Search
USPC ............... 411/41, 45–48, 15, 508, 60.1, 57.1, 411/DIG. 37; 24/295, 297
See application file for complete search history.

(56) References Cited

U.S. PATENT DOCUMENTS

| | | | | | |
|---|---|---|---|---|---|
| 4,375,342 | A | * | 3/1983 | Wollar et al. ................... | 411/41 |
| 4,952,106 | A | * | 8/1990 | Kubogochi et al. ............. | 411/48 |
| 5,211,519 | A | * | 5/1993 | Saito ................................ | 411/45 |
| 5,261,772 | A | * | 11/1993 | Henninger et al. ............. | 411/46 |
| 5,375,954 | A | * | 12/1994 | Eguchi ............................ | 411/48 |
| 5,641,255 | A | * | 6/1997 | Tanaka ............................ | 411/48 |
| 5,850,676 | A | * | 12/1998 | Takahashi et al. .............. | 24/297 |
| 5,902,083 | A | * | 5/1999 | Hwang ........................... | 411/48 |
| 6,089,805 | A | * | 7/2000 | Salmon ........................... | 411/48 |
| 6,364,586 | B1 | * | 4/2002 | Okada ............................. | 411/41 |
| 6,540,461 | B1 | * | 4/2003 | Hawang .......................... | 411/48 |
| 6,726,417 | B2 | * | 4/2004 | Kanie .............................. | 411/48 |
| 6,769,849 | B2 | * | 8/2004 | Yoneoka ......................... | 411/45 |
| 7,207,759 | B2 | * | 4/2007 | Kato ................................ | 411/45 |
| 7,249,922 | B2 | * | 7/2007 | Yoneoka ......................... | 411/45 |
| 7,677,850 | B2 | * | 3/2010 | Sano ................................ | 411/45 |
| 7,690,876 | B2 | * | 4/2010 | Kawai et al. .................... | 411/45 |
| 2006/0171793 | A1 | | 8/2006 | Kawai et al. | |
| 2008/0193250 | A1 | * | 8/2008 | Boubtane ........................ | 411/48 |

FOREIGN PATENT DOCUMENTS

| | | |
|---|---|---|
| JP | 61-190014 U | 11/1986 |
| JP | 4-110212 U | 9/1992 |
| JP | 6-69417 U | 9/1994 |
| JP | 2006-125571 A | 8/2006 |
| JP | 2006-207607 A | 8/2006 |
| JP | 2006-226368 A | 8/2006 |
| JP | 3126590 U | 10/2006 |

OTHER PUBLICATIONS

PCT Search Report dated Nov. 18, 2008 (and English translation).

* cited by examiner

*Primary Examiner* — Nkeisha Smith
(74) *Attorney, Agent, or Firm* — Thomas|Horstemeyer, LLP (57) ABSTRACT

Insertion force for installing a clip to a body panel, and retaining force of the clip after installation, are obtained by an engagement leg section. A click sensation when the clip is installed to the body panel is obtained by a click leg section.

6 Claims, 10 Drawing Sheets

CLIP AND SUPPORT MEMBER

CROSS-REFERENCE TO RELATED APPLICATION

This application is the National Stage of International Application no. PCT/JP2008/064047 filed Aug. 5, 2008, which claims the benefit of Japanese patent application number 2007-207654 filed Aug. 9, 2007, the contents of which are incorporated by reference herein.

FIELD OF THE INVENTION

The present invention relates to a clip employed when attaching a vehicle bumper or the like, and a support member provided with such a clip.

BACKGROUND

A vehicle bumper is fixed to a body panel via a retainer, and the retainer is fixed to the body panel using a clip. For example, in Japanese Patent Application Laid-Open (JP-A) No. 2006-125571 there is a clip configured with a grommet and pin, a sack body of the grommet is inserted into attachment holes formed in the body panel and the retainer, respectively, and after the body panel and the retainer are nipped between a flange portion and a claw portion formed at the grommet, the pin is inserted into the sack body. The amount of widening of the claw portion alone is increased by the pin pressing against the inside of the claw portion and widening the claw portion, and the retaining force of the retainer to the body panel is increased.

However, in Japanese Patent Application Laid-Open (JP-A) No. 2006-125571, when the claw portion engages with the pin, after the claw portion has been widened once (to the maximum widening amount), engagement is made with a smaller diameter step portion formed on the outer face of the pin. In the state in which the claw portion is engaged with the step, the widening amount of the claw portion is less than the maximum widening amount.

In other words, in order to raise the retaining force of the clip without changing the insertion force of the pin, a method of making the step smaller might be considered, since the closer the widening amount of the claw portion in the state of engagement with the step to approaches the maximum widening amount the better. However if the step is made smaller, then the click sensation when the claw portion engages with the step becomes less discernable.

SUMMARY

The present invention is made in consideration of the above circumstances, with an objective of providing a clip that can obtain sufficient retaining force and sufficient click sensation, and providing a support member provided with such a clip.

A first aspect of the present invention provides a clip including: a male member having a bar shaped axial portion, and a head portion provided at one end portion of the axial portion, the head portion being larger than a profile of the axial portion; and a female member having an engagement leg body that extends from an inner edge portion of a ring-shaped flange that is contactable with the head portion, the engagement leg body configuring a portion of a hollow portion into which the axial portion is insertable, and the engagement leg body resiliently deforming outwards when pressed by the axial portion, and a click leg body that configures the hollow portion together with the engagement leg body, and is formed with an engagement claw that engages with an engaging hole formed at the axial portion when the axial portion has pressed and expanded the engagement leg body.

In the above aspect, the clip is configured by a male member and a female member, the male member being equipped with the bar shaped axial portion, and the head portion provided at one end portion of the axial portion being larger than the profile of the axial portion. The female member is provided with the ring-shaped flange that is contactable with the head portion, and the engagement leg body and the click leg body extend from the inner edge portion of the flange and configure the hollow portion into which the axial portion is insertable.

The engagement leg body resiliently deforms outwards when pressed by the axial portion of the male member, and the click leg body is formed with the engagement claw that engages with the engaging hole formed at the axial portion when the axial portion has pressed and expanded the engagement leg body.

Thereby, in the state in which the engagement leg body and the click leg body have been inserted into the attachment hole of smaller diameter than the outer diameter of the flange formed at an attached member, when the axial portion is inserted into the hollow portion configured by the engagement leg body and the click leg body, the engagement leg body resiliently deforms outwards due to the axial portion, nipping the attached member between the flange and the engagement leg body. The engagement claw of the click leg body engages with the engaging hole of the axial portion when the engagement leg body is pressed and expanded by the axial portion. The male member thereby achieves a state in which it is fixed to the female member.

In other words, the insertion force when installing the clip to the attached member, and the retaining force of the clip after installation, are obtained by the engagement leg body, and the click sensation when the clip is installed to the attached member is obtained by the click leg body. In this manner, according to the present invention, the roles of creating the retaining force and the click sensation are given independently to the engagement leg body and the click leg body, and both sufficient retaining force and sufficient click sensation can be obtained.

Furthermore, since the engagement leg body does not need to have an engaging function with the axial portion, such an engaging function does not, for example, make the separation width of the engagement leg body narrower when engaged with the axial portion, and the separation width of the engagement leg body can be made to simply become gradually wider with movement of the axial portion towards the back of the hollow portion. In other words, the amount of widening of the engagement leg body to obtain the necessary retaining force is the same as the maximum widening amount, facilitating design according to the application.

In the first aspect of the present invention, the click leg body may widen in diameter when the engagement claw is being engaged with the engaging hole, and the click leg body may resiliently return to an original state when the engagement claw has engaged with the engaging hole.

According to the above configuration, by making click leg body resiliently return to the original state when the engagement claw has engaged with the engaging hole, and making the click leg body widen in diameter when the engagement claw is being engaged to the engaging hole, the amount of widening of the click leg body can be suppressed to a minimum, such that as far as possible there is no impact on the insertion force of the axial portion.

In the first aspect of the present invention, a sloping face that slopes along a circumferential direction may be provided at the surface of the flange, and a sloping rib contactable with the sloping face may be provided at the head portion.

In the above configuration, the sloping face that slopes along the circumferential direction is provided at the surface of the flange of the female member, and the sloping rib with the sloping face is provided at the head portion of the male member. Consequently, in the installed state of the male member to the female member, when the axial portion is rotated in the direction from the base portion towards the apex portions of the sloping face, the sloping rib makes contact with the sloping face on the flange, enabling the male member to be raised due to the head portion moving along the slope of the sloping face. The male member can thereby be removed from the female member.

In the first aspect of the present invention, a projecting portion may be provided at the internal face of the engagement leg body, a leading end of the projecting portion being formed in a pointed shape that makes contact with the external face of the axial portion; and a guide rib may be provided along an axial direction of the axial portion, such that when the guide rib makes contact with the projecting portion, the guide rib is guided towards a base portion of the projecting portion.

In the above configuration, the projecting portion is provided at the internal face of the engagement leg body, the leading end of the projecting portion being formed in a pointed shape that makes contact with the external face of the axial portion. A guide rib is provided at the axial portion along the axial direction, and when the guide rib makes contact with the projecting portion the guide rib is guided towards a base portion of the projecting portion.

In other words, when the axial portion is being inserted into the hollow portion, the guide rib makes contact with the projecting portion of the engagement leg body, such that the axial portion is guided to rotate the axial portion to a specific position. Consequently, when the male member is being installed to the female member, the directionality of the axial portion with respect to the hollow portion does not need to be considered, facilitating assembly.

A second aspect of the present invention provides a support member that supports an installation member for installation to a body panel, the support member including: a hole portion formed in the support member; an engagement leg body that extends from an inner edge portion at the hole portion, the engagement leg body configuring a portion of a hollow portion into which an axial body inserted into the hole portion and an attachment hole formed in the body panel is insertable, and the engagement leg body resiliently deforming outwards when pressed by the axial body; a click leg body that configures the hollow portion together with the engagement leg body, and is formed with an engagement claw that engages with an engaging hole formed at the axial body when the axial body has pressed and expanded the engagement leg body; and a seat formed around a periphery of the hole portion, the seat receiving a head portion formed at an end portion of the axial body In the above configuration, the hole portion is formed at the support member, the engagement leg body and the click leg body extend from the inner edge portion at the hole portion, and are insertable into the attachment hole formed in the body panel. The hollow portion is configured by the engagement leg body and the click leg body, into which the axial body is inserted. When the axial body is inserted, the engagement leg body resiliently deforms when pushed outside by the axial body, and the engagement claw formed at the click leg body engages with the engaging hole formed at the axial body when the axial body has pressed and expanded the engagement leg body. When this occurs, the head portion formed at the end portion of the axial body makes contact with the seat provided around the periphery of the hole portion. Due thereto, the support member is fixed to the body panel, and substantially the same effect is obtained thereby as that obtained in the first aspect of the present invention.

In the second aspect of the present invention, the click leg body may widen in diameter when the axial body is inserted, and when the engagement claw has engaged with the engaging hole, the click leg body may resiliently return to an original state. Due to the above configuration, substantially the same effect is obtained as that obtained in the first aspect of the present invention.

In the second aspect of the present invention, a sloping face that slopes along a circumferential direction may be provided at a surface of the seat, and a sloping rib may be provided at the head portion, the sloping rib being contactable with the sloping face. Due to the above configuration, substantially the same effect is obtained as that obtained in the first aspect of the present invention.

In the second aspect of the present invention, a projecting portion may be provided at an internal face of the engagement leg body, a leading end of the projecting portion being formed in a pointed shape that makes contact with the external face of the axial body; and a guide rib may be provided along the axial direction of the axial body, and when the guide rib makes contact with the projecting portion, the guide rib may be guided towards a base portion of the projecting portion. Due to the above configuration, substantially the same effect is obtained as that obtained in the first aspect of the present invention.

The present invention, by configuration as described above, can obtain sufficient retaining force and sufficient click sensation.

DESCRIPTION OF PREFERRED EMBODIMENTS

Explanation follows regarding a clip according to an exemplary embodiment of the present invention, with reference to the drawings.

Figure 1:
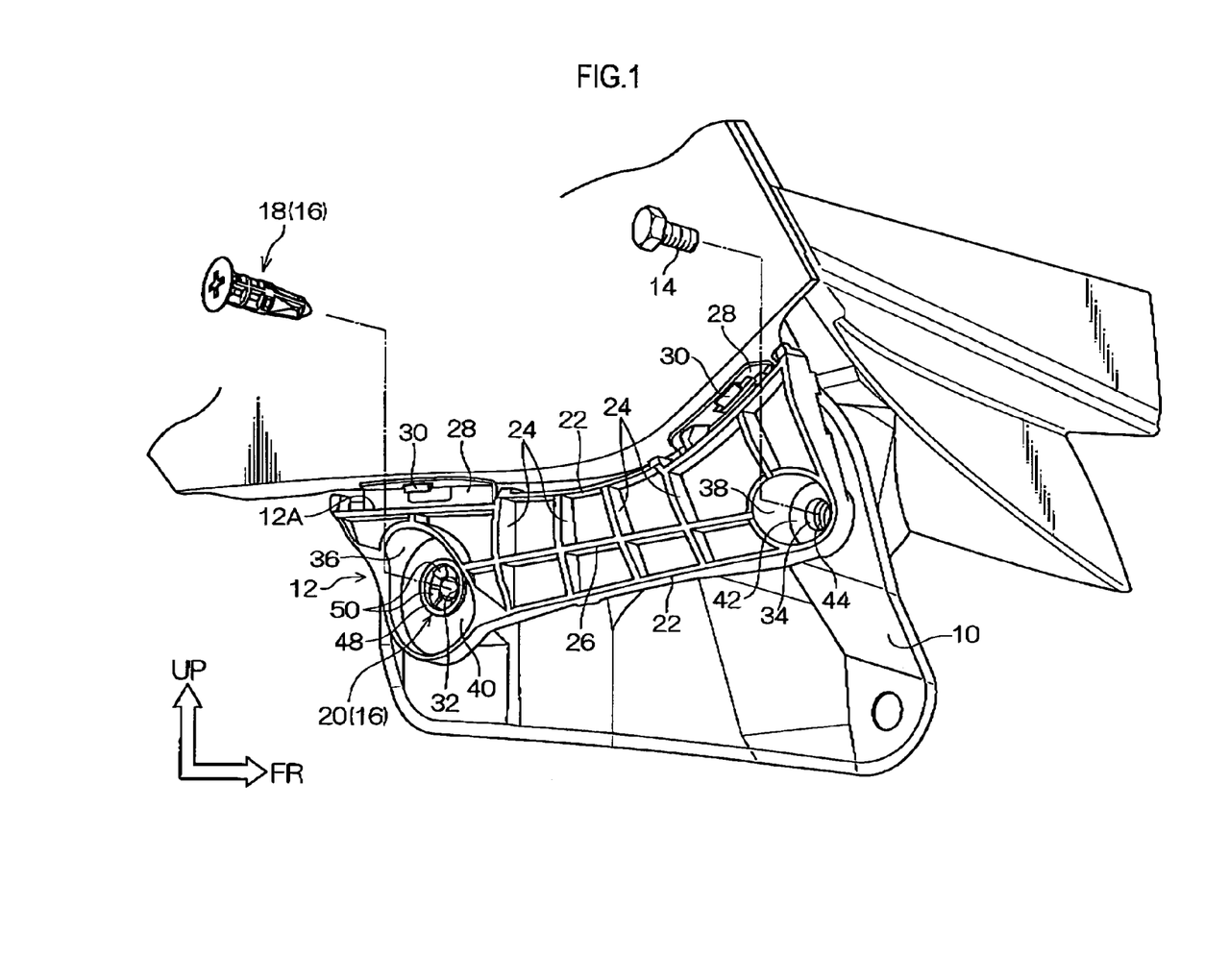
FIG. 1 is a perspective view showing a state for fixing a retainer to a body panel using a clip according to an exemplary embodiment of the present invention.

As shown in FIG. 1, in order to install a vehicle bumper (not shown in the figures) to a body panel 10, a retainer (support member) 12 is provided between the body panel 10 and the bumper, such that the bumper is fixed to the body panel 10 with the retainer 12 interposed therebetween.

In order to fix the retainer 12 to the body panel 10, a resin-formed clip 16 is employed separate from, and in addition to, a fixing screw 14. The clip 16 is configured from a male member 18 and a female member 20, however in this case the female member 20 is provided integrally to the retainer 12.

The retainer 12 forms substantially a long plate shape, a gentle circular arc described along its length direction, following along the shape of the fixing portion of the body panel 10. In the drawing, arrow UP indicates the vehicle top direction and arrow FR indicates the vehicle forward direction, respectively, and the retainer 12 here is the one disposed on the vehicle right hand side when viewed from the front.

Figure 2A:
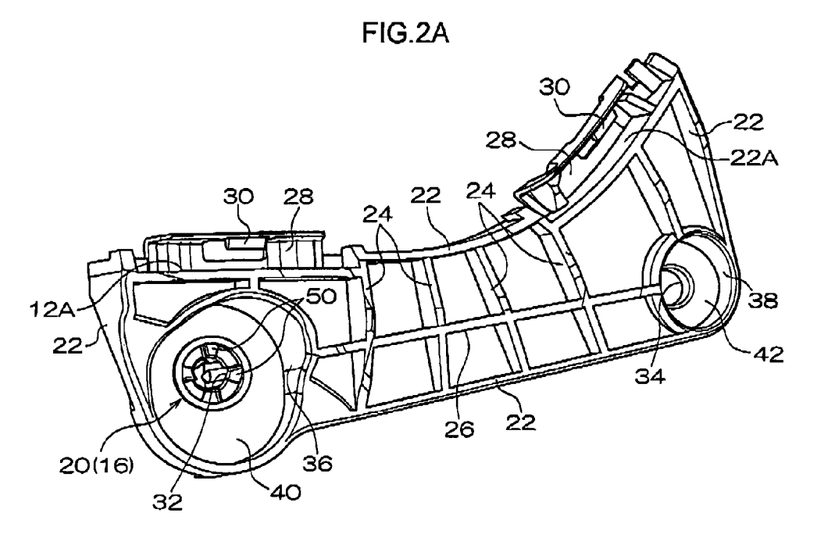
FIG. 2A is a front-face perspective view of a retainer according to an exemplary embodiment of the present invention.
Figure 2B:
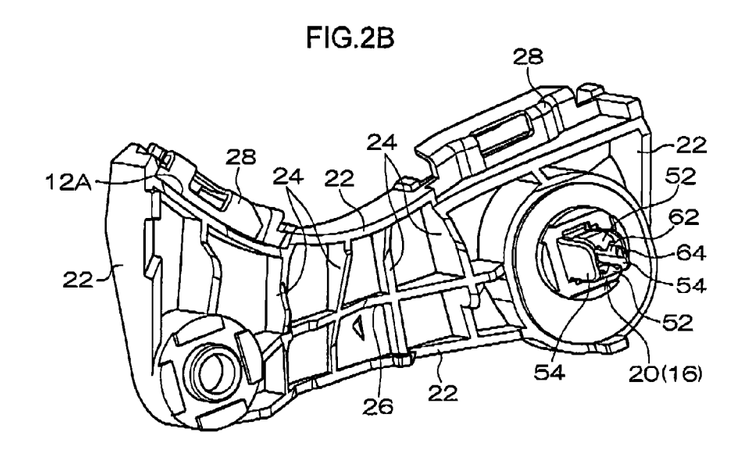
FIG. 2B is a back-face perspective view of a retainer according to an exemplary embodiment of the present invention.

As shown in FIG. 1 and FIG. 2, reinforcement ribs 22 are provided projecting out from edge portions of the retainer 12, and reinforcement ribs 24 are provided spanning across in the width direction of the retainer 12, between the respective reinforcement rib 22 at the top and at the bottom of the retainer 12. A reinforcement rib 26 is further provided along the length direction of the retainer 12, at a width direction central portion of the retainer 12, connecting between the reinforcement ribs 24. The strength of the retainer 12 is thereby raised, and the retainer 12 is prevented from deforming.

A top face 12A, running along the length direction of the retainer 12, is configured by one of the reinforcement ribs 22, and latching plates 28 in substantially L shapes extend out from both length direction end portions of the top face 12A (the left and right of the top face 12A), with the leading ends of the latching plates 28 bending around to face forwards.

A latching portion 30 is provided projecting downwards from a central portion of the leading end of each of the latching plates 28. While not shown in the drawings, engaging holes formed in flanges that jut out from the back face of the bumper fit over the latching portions 30, and the bumper is thereby temporarily installed to the retainer 12, so as to be fixable to the body panel 10 using non-illustrated fasteners.

An attachment hole 32 employed by the clip 16, and an attachment hole 34 employed by the fixing screw 14, are formed respectively at the left and right of a bottom portion of the retainer 12, and circular arc walls 36, 38 are formed respectively around peripheral edge portions on the front face side of the attachment holes 32, 34, the circular arc walls 36, 38 having larger diameters than those of the attachment holes 32, 34. Flat face shaped seats 40, 42 are respectively provided between the circular arc wall 36 and the attachment hole 32, and between the circular arc wall 38 and the attachment hole 34.

The attachment hole 34 is capable of alignment with a fixing hole 44 formed on the body panel 10 side, and when the attachment hole 34 is in an aligned state with the fixing hole 44, the fixing screw 14 is inserted into the attachment hole 34, so as to screw the fixing screw 14 into the fixing hole 44.

Figure 3:
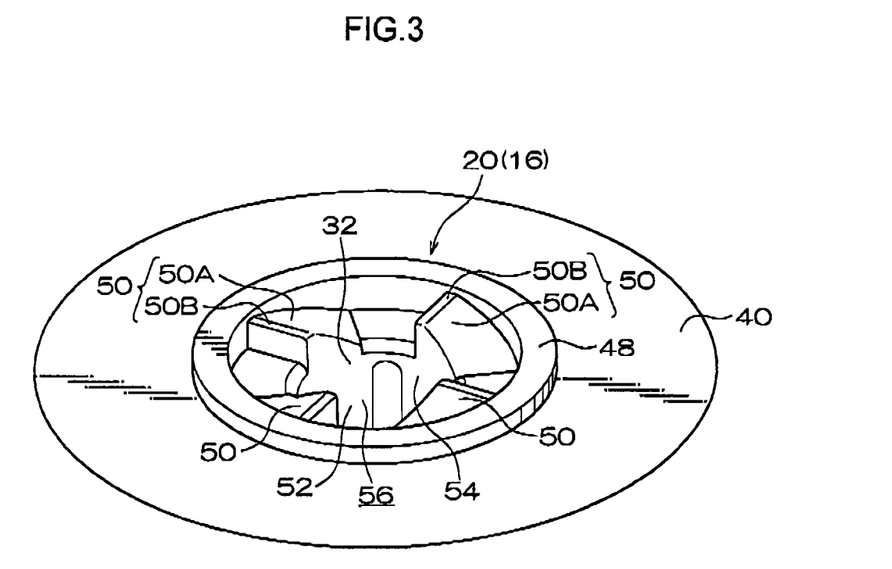
FIG. 3 is an enlarged perspective view showing sloping face portions that raise a male member of a clip according to an exemplary embodiment of the present invention.
Figure 4:
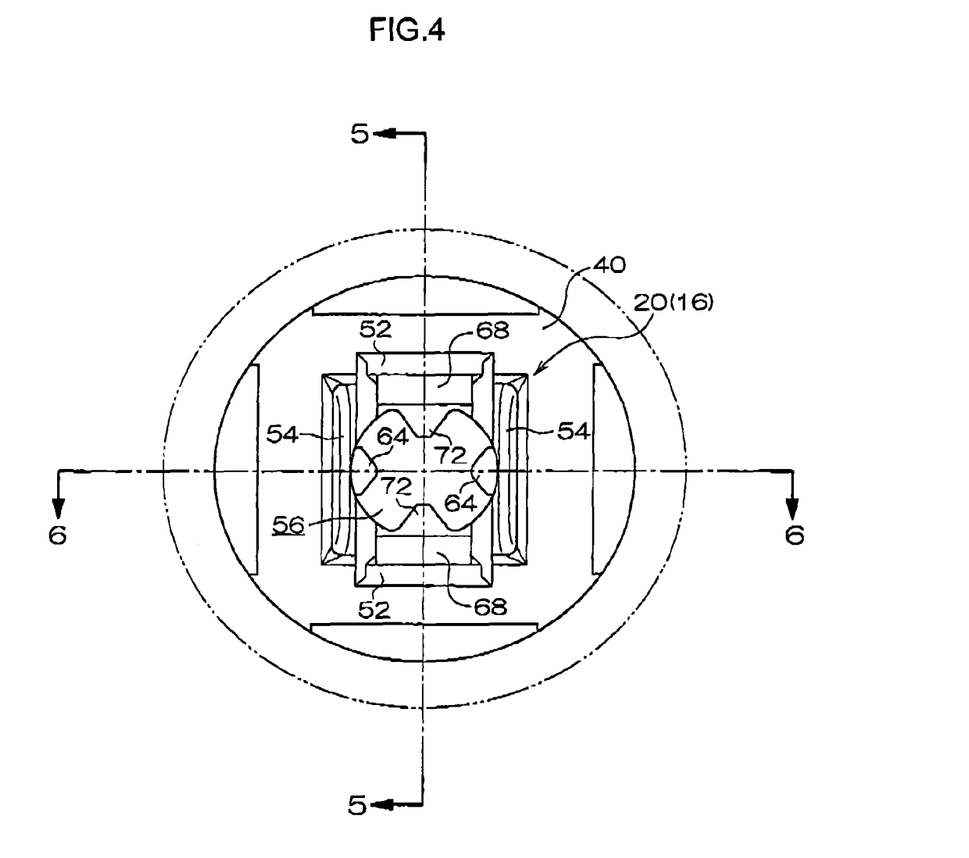
FIG. 4 is an enlarged bottom face view showing a female member of a clip according to an exemplary embodiment of the present invention.

The female member 20 is provided at the attachment hole 32. A ring shaped portion 48 is provided at the seat (flange) 40 at the outside of the attachment hole 32, the ring shaped portion 48 being formed projecting out in a circular shape concentric to the attachment hole 32. Sloping portions 50 are formed sloping along the circumferential direction of the ring shaped portion 48 at 90° intervals between the ring shaped portion 48 and an inside edge portion at the attachment hole 32, as shown in FIG. 3. A sloping face 50A of each of the sloping portions 50 slopes such that the height of the sloping portions 50 gets higher on progression in an anti-clockwise direction. Apex portions 50B of the sloping portions 50 are set so as to be slightly lower than the end face of the ring shaped portion 48.

A pair of mutually facing engagement leg sections (engagement leg bodies) 52 projects out perpendicularly from inside edge portions at the attachment hole 32, and click leg sections (click leg bodies) 54 project out perpendicularly between one of the engagement leg sections 52 and the other of the engagement leg sections 52. A substantially circular pillar shaped hollow portion 56 is configured by the internal faces of the click leg sections 54 and the internal faces of the engagement leg sections 52, and the engagement leg sections 52 and the click leg sections 54 are formed such that a substantially rectangular shape is formed by the outside faces of the click leg sections 54 and the outside faces of the engagement leg sections 52 (as described in detail later).

Figure 5A:
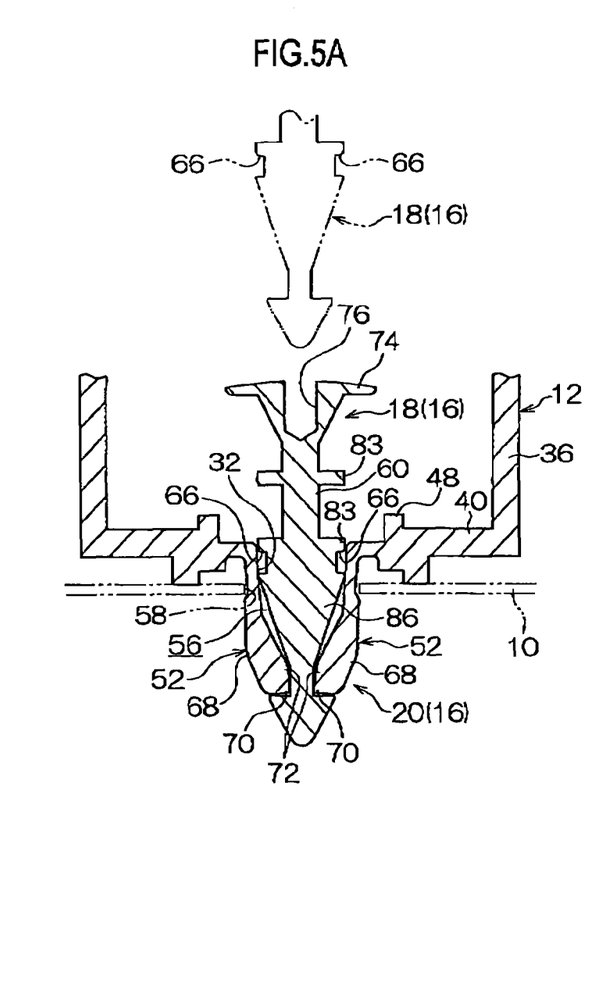
FIG. 5A is a cross-section taken on line 5-5 of FIG. 4, showing a male member part-way through installation to a female member.
Figure 5B:
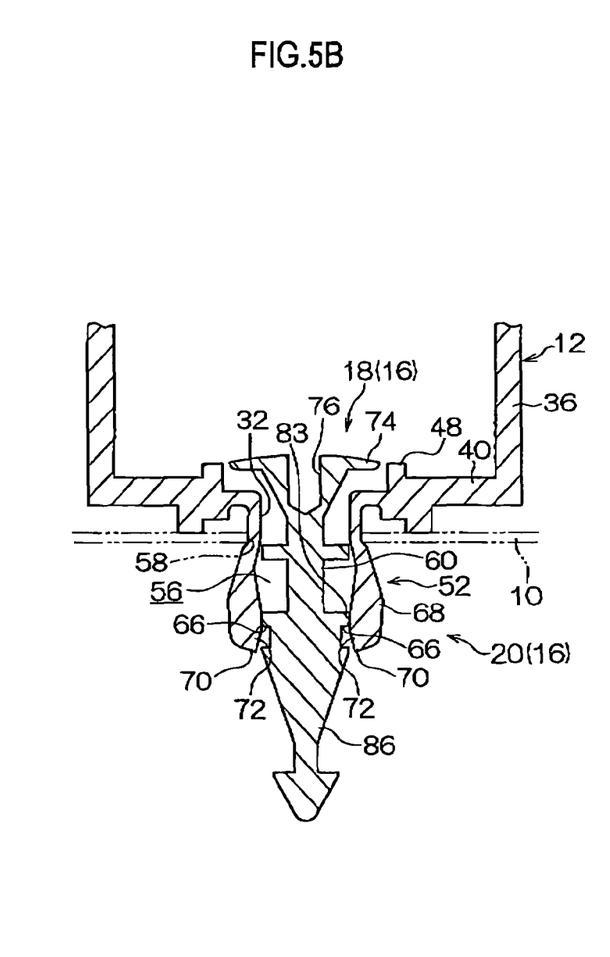
FIG. 5B is a cross-section taken on line 5-5 of FIG. 4, showing a male member in an installed state to a female member.
Figure 6A:
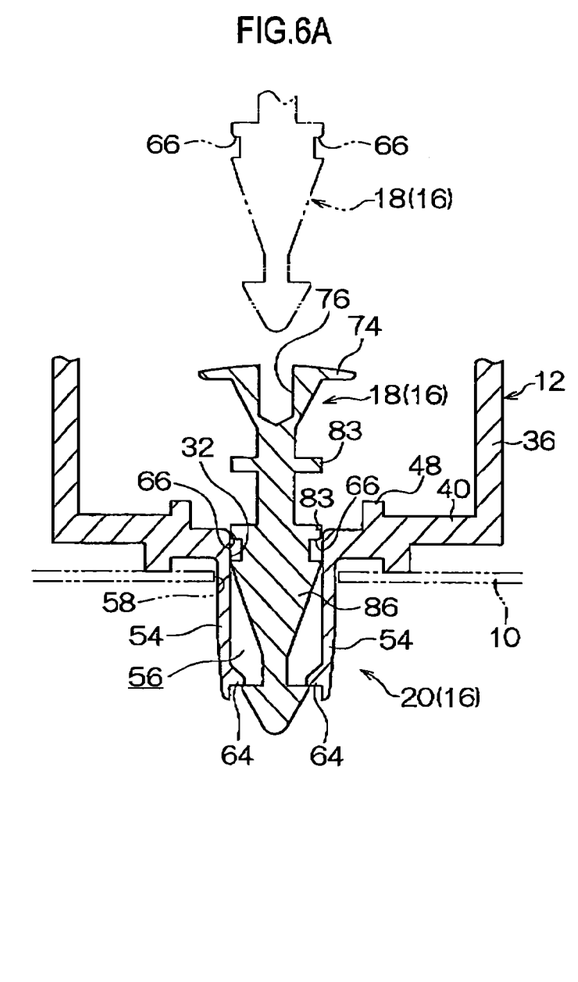
FIG. 6A is a cross-section taken on line 6-6 of FIG. 4, showing a male member part-way through installation to a female member.
Figure 6B:
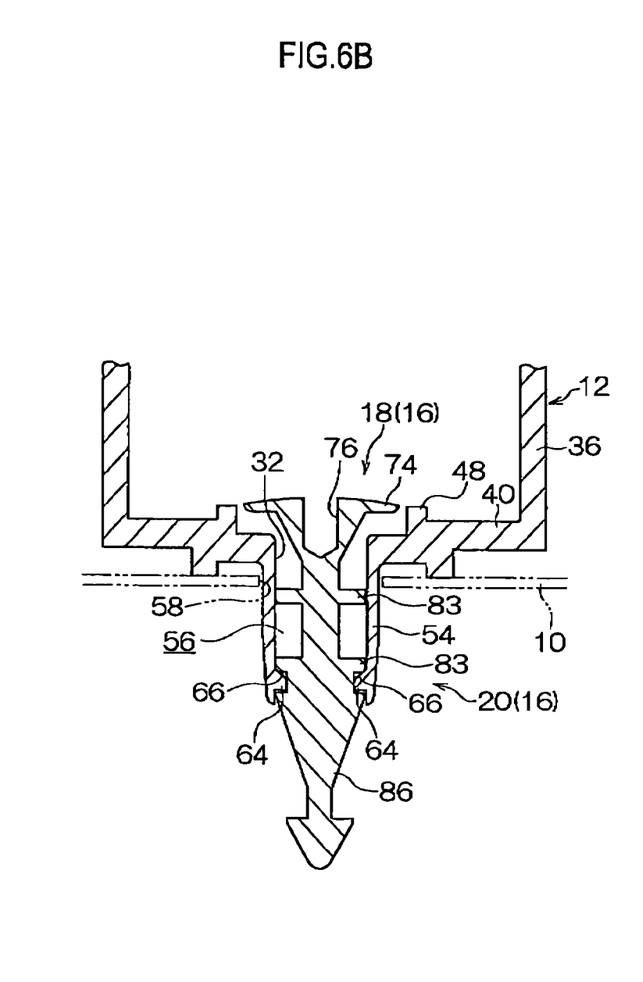
FIG. 6B is a cross-section taken on line 6-6 of FIG. 4, showing a male member in an installed state to a female member.

Due thereto, as shown in FIG. 5 and FIG. 6, the click leg sections 54 and the engagement leg sections 52 are capable of being inserted into a rectangular hole 58 formed as an attachment hole to the body panel 10, and a substantially circular pillar shaped axial portion 60 of the male member 18, described below, is insertable into the hollow portion 56.

As shown in FIG. 6A and FIG. 6B, the click leg sections 54 are formed of substantially flat plate shape, with circular arc grooves 62 (see FIG. 2B) formed at central portions of the internal faces of the click leg sections 54, contiguous to the internal edge portion at the attachment hole 32 and formed along the extending direction of the click leg sections 54. The axial portion 60 of the male member 18 is consequently guided along the circular arc grooves 62.

Engagement claws 64, of substantially triangular shape in cross-section, project out at end portions of the circular arc grooves 62. The engagement claws 64 engage with engagement holes 66 formed in the axial portion 60, and the engagement claws 64 cause the dimension between the click leg sections 54 to widen in diameter when being engaged with the engagement holes 66. The shortest separation distance between the engagement claws 64 is set such that, in a state in which the engagement claws 64 have engaged with the engagement holes 66, the click leg sections 54 resiliently return to the original state.

As shown in FIG. 5A and FIG. 5B, the engagement leg sections 52 are formed in substantially flat plate shapes, with bulging portions 68 provided across the entire width direction region of the engagement leg sections 52, bulging towards the outside, as apex portions, below extending direction central portions of the engagement leg sections 52. The separation distance between one of the bulging portions 68 and the other of the bulging portions 68 is larger than the width dimension of the rectangular hole 58.

The internal face of the engagement leg sections 52 is formed in a circular arc shape that is contiguous to the internal edge portion at the attachment hole 32, and the axial portion 60 is guided thereby. In addition, contact portions 70, of substantially triangular shape in cross-section, are provided projecting out the leading end portion of the internal face side of the engagement leg sections 52.

Substantially square pyramid shaped projection portions 72 are provided at the internal face of the engagement leg sections 52, at central portions in the engagement leg section 52 extending direction, the projection portions 72 gradually projecting out further on progression towards the contact portions 70, with the apex portions of the projection portions 72 provided contiguous to the leading end potions of the contact portions 70.

Figure 7:
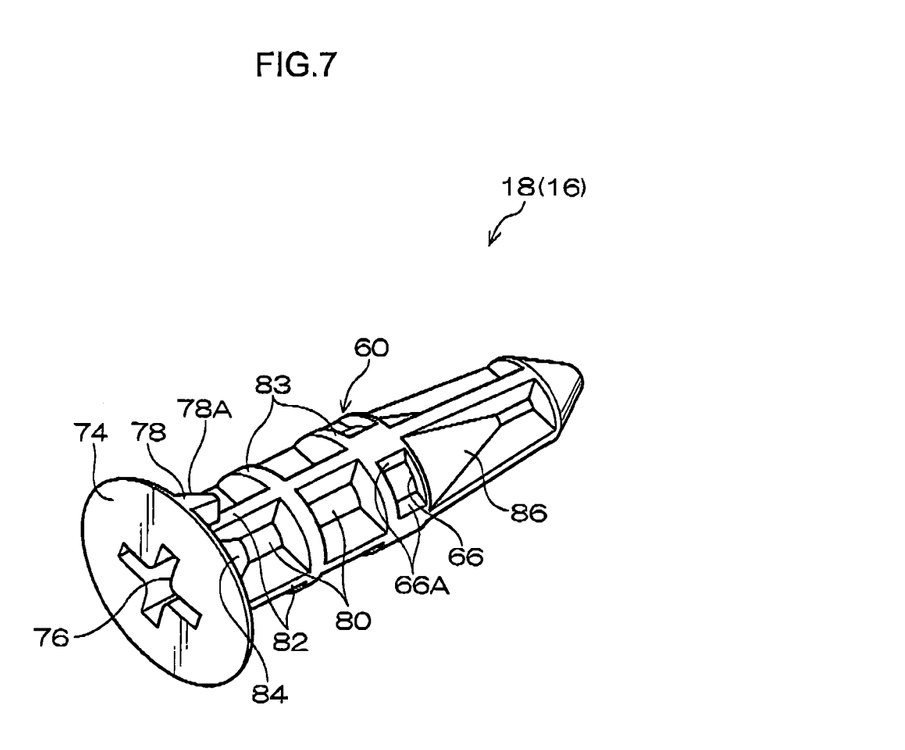
FIG. 7 is a perspective view of a male member of a clip according to an exemplary embodiment of the present invention.
Figure 8A:
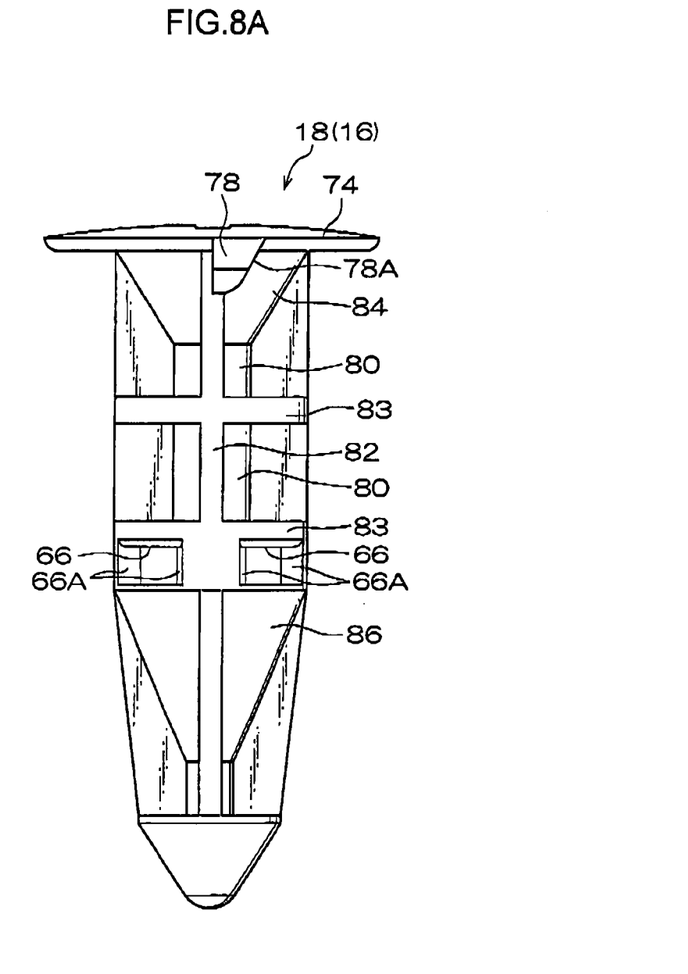
FIG. 8A is a left-side face view of a male member of a clip according to an exemplary embodiment of the present invention.
Figure 8B:
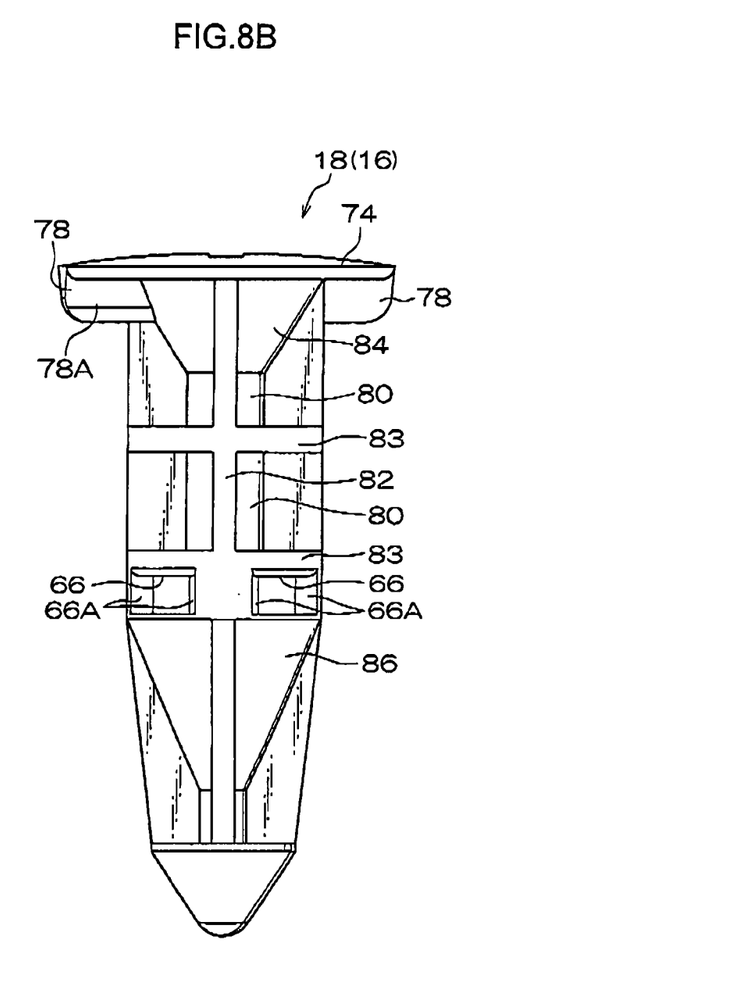
FIG. 8B is a front face view of a male member of a clip according to an exemplary embodiment of the present invention.

Explanation follows of the male member. As shown in FIG. 7 and FIG. 8, the male member 18 is equipped with the axial portion 60 formed in a substantially circular pillar shape, insertable within the hollow portion 56 (see FIG. 5A). A head portion 74 is provided at a portion at one end of the axial portion 60, contactable with a portion around the peripheral edge of the attachment hole 32.

A cross-shaped groove 76 is formed in the top face of the head portion 74, the cross-shaped groove 76 being engageable by a screw driver or the like. A sloping rib 78 is formed at the bottom face of the head portion 74, the sloping rib 78 formed with a sloping face 78A that is contactable with the sloping faces 50A of the sloping portions 50. The sloping rib 78 is set to be slightly lower than the height of the sloping portions 50.

In order to prevent shrinkage of the outer peripheral face, the axial portion 60 provided with indented thinned portions 80, in a state with plural guide ribs 82 formed running along the axial direction. Cross-ribs 83 are also formed at specific intervals, running along the circumferential direction of the axial portion 60 between guide ribs 82. Furthermore, in order to increase strength, thickened portions 84 are provided at the connection portion between the head portion 74 and the axial portion 60, having a diameter that gradually increases from the axial portion 60 to the head portion 74, such that the head portion 74 sides of the thickened portions 84 are substantially in the same plane as the leading end face of the guide ribs 82.

Rectangular shaped engaging holes 66 are provided indented in central portions of the axial portion 60, at 90° intervals along the circumferential direction of the axial portion 60, so as to be slightly indented from the plane of the end faces of the guide ribs 82 and the cross-ribs 83. Engaging claws 64 of the click leg sections 54 engage in the engaging holes 66 (see FIG. 6B). Sloping faces 66A are formed at the side walls of the engaging holes 66, and the engaging claws 64 are moved outwards along the sloping faces 66A by rotating the axial portion 60, releasing the engaged state of the engaging claws 64 with the sloping faces 66A.

A cone portion 86 is provided at a bottom edge portion of the engaging holes 66, with a diameter that gradually increases from the leading end side of the axial portion 60, the cone portion 86 being contactable with the contact portions 70 and the projection portions 72 of the engagement leg sections 52 and with the engaging claws 64 of the click leg sections 54. Furthermore, the leading end portion of the axial portion 60 is of a conical shape, and the axial portion 60 is easily inserted into the hollow portion 56.

Explanation follows next of the operation of the clip according to the present exemplary embodiment of the invention.

In the present invention, first, the attachment holes 32, 34 of the retainer 12 are aligned to the fixing hole 44 and the rectangular hole 58 (see FIG. 5) of the body panel 10 shown in FIG. 1. The fixing hole 44 is formed in a conical shape, and after the retainer 12 has been installed to the body panel 10 with the clip 16 interposed therebetween, the fixing screw 14, inserted through the attachment hole 34, can be screwed into the fixing hole 44.

Then, as shown in FIG. 5 and FIG. 6, the engagement leg sections 52 and the click leg sections 54, of the female member 20 provided at the retainer 12, are inserted into the rectangular hole 58. However, since the separation distance between the bulging portions 68 of the engagement leg sections 52 is larger than the width dimension of the rectangular hole 58, the engagement leg sections 52 pass through inside the rectangular hole 58 in a widthwise narrowed state. When the bulging portions 68 have passed through the rectangular hole 58, the engagement leg sections 52 revert to the original state, the bulging portions 68 make contact with the peripheral edge portions of the rectangular hole 58, and the engagement leg sections 52 adopt interim fixed state to the rectangular hole 58.

Then, in this state, the axial portion 60 of the male member 18 is inserted into the hollow portion 56 configured by the engagement leg sections 52 and the click leg sections 54. Since the internal faces of the engagement leg sections 52 are circular arc shaped and the circular arc grooves 62 are provided at the internal faces of the click leg sections 54, the axial portion 60 is guided in smoothly thereby towards the back of the hollow portion 56.

As shown in FIG. 5A and FIG. 5B, the substantially square pyramid shaped projection portions 72 are provided at leading end portions at the internal face side of the engagement leg sections 52, and the apex portions of the projection portions 72 are formed contiguous at the leading end portions of the contact portions 70. In other words, the sloping faces of the projection portions 72 are formed along the width direction and along the axial direction of the engagement leg sections 52. The plural guide ribs 82 are formed along the axial direction of the outer peripheral face of the axial portion 60. When the guide ribs 82 make contact with the projection portions 72, the axial portion 60 is rotated to follow the sloping faces of the projection portions 72 formed along the width direction of the engagement leg sections 52.

In other words, when inserting the axial portion 60 into the hollow portion 56, when the guide ribs 82 of the axial portion 60 make contact with the projection portions 72 of the engagement leg sections 52, the axial portion 60 is guided to a specific position (a position in which each of the apex portions of the projection portions 72 is disposed between one of the guide ribs 82 and another of the guide ribs 82). Therefore, when the male member 18 is being installed to the female member 20, there is no requirement to consider the directionality of the axial portion 60 with respect to the hollow portion 56, facilitating assembly.

Then, when the axial portion 60 is moved further towards the back of the hollow portion 56 from the accommodated state with the axial portion 60 in the specific position, the projection portions 72 provided at the engagement leg sections 52 make contact with the cone portion 86 of the axial portion 60, and the engagement leg sections 52 are resiliently deformed towards the outside due to the projection portions 72. Due thereto, the body panel 10 is nipped between the seat 40, and the engagement leg sections 52.

As shown in FIG. 6A and FIG. 6B, the engaging claws 64 are respectively provided at the click leg sections 54, and when the engaging holes 66 of the axial portion 60 reach the leading end portions of the engaging claws 64, the engaging claws 64 engage with the engaging holes 66. When the engaging claws 64 engage with the engaging holes 66, the click leg sections 54 that had been widened in diameter resiliently return to the original state, suppressing widening of the click leg sections 54 to the minimum level, such that as far as possible there is no impact on the insertion force of the axial portion 60.

Then, when the engaging claws 64 have engaged with the engaging holes 66, the head portion 74 of the axial portion 60 makes contact with the apex portions 50B of the sloping portion 50 shown in FIG. 3, and the top face of the head portion 74 becomes in the same plane as the end face of the ring shaped portion 48. The male member 18 is fixed to the female member 20 in this state, and the retainer 12 adopts an installed state to the body panel 10 with the clip 16 therebetween.

In this manner, in the present exemplary embodiment, the insertion force of the male member 18 when the clip 16 is being installed to the body panel 10, and the retaining force of the clip 16 after installation, are obtained by the engagement leg sections 52, and a click sensation when the clip 16 is being installed to the body panel 10 is obtained by the click leg sections 54. In other words, the roles of creating the retaining force and the click sensation are given independently to the engagement leg sections 52 and the click leg sections 54. Thereby, in the clip 16, both sufficient retaining force and sufficient click sensation can be obtained.

Furthermore, in a state in which the engaging claws 64 are engaged with the engaging holes 66 as shown in FIG. 6B, at the engagement leg sections 52 side, the sloping faces of the projection portions 72 are in a state of contact with portions at the peripheral edge of the engaging holes 66, as shown in FIG. 5B, and since a gap does not arise between the engagement leg sections 52 and the axial portion 60, the retaining force due to the engagement leg sections 52 is high.

Since the engagement leg sections 52 do not need to have an engaging function with the axial portion 60, such an engaging function does not make the separation width of the engagement leg sections 52 narrower when engaged with the axial portion 60, and the separation width of the engagement leg sections 52 can be made to simply become gradually wider with movement of the axial portion 60 towards the back of the hollow portion 56. Consequently, the amount of widening of the engagement leg sections 52 to obtain the necessary retaining force can be made the same as the maximum widening amount, facilitating design according to the application.

However, the cross-shaped groove 76 is formed at the head portion 74 of the male member 18, and so by rotating the male member 18 in an anti-clockwise direction from the fixed state of the male member 18 to the female member 20, the sloping ribs 78 provided at the bottom face of the head portion 74 move along the sloping faces of the sloping portions 50 provided around the attachment hole 32.

As shown in FIG. 3, due to the sloping faces 50A sloping such that the height of the sloping portions 50 gets higher on progression in the anti-clockwise direction, through the head portion 74 the male member 18 rises with rotation in the anti-clockwise direction. Removal of the male member 18 from the female member 20 is thereby enabled.

By rotating the male member 18, the engaging claws 64 move along the sloping faces 66A formed at the side walls of the engaging holes 66, and the engaging claws 64 can be released from engagement with the engaging holes 66. Excessive stress acting on the engaging claws 64 is thereby avoided when removing the male member 18 from the female member 20.

Figure 9:
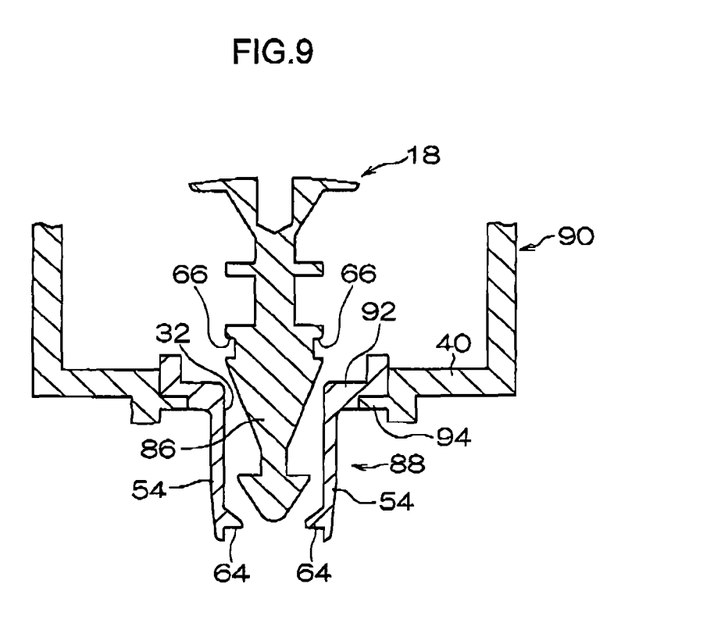
FIG. 9 is a cross-section showing an exemplary modification of a female member of a clip according to an exemplary embodiment of the present invention.

Note that while in the present exemplary embodiment the female member 20 is formed integrally at the retainer 12, reducing the number of components, and reducing the number of manufacturing processes, such that a reduction in cost can be achieved, however, as shown in FIG. 9, a female member 88 and a retainer 90 may be separate components, with the female member 88 fixed to the retainer 90 after molding, such as, for example, by welding or the like. In such cases, a flange 92 needs to be provided in the female member 88 to the engagement leg sections 52 and the click leg sections 54, and a receiving portion 94 needs to be provided at the seat 40 for welding to the flange 92.

When the retainer 90 and the female member 88 are made as separate components in this manner, although the number of components increases, the structure of the molds is simplified, in comparison to when the female member 20 is integrally formed at the retainer 12, as shown in FIG. 6.

Furthermore, extending portions (not shown in the figures) may be provided extending even further out from the contact portions 70 provided at the leading end portion of the engagement leg sections 52, such that the leading end portions of the extending portions get closer to each other. Thereby, the leading end portions of the engagement leg sections 52 are even more constricted, and the engagement leg sections 52 are guided easily when inserting the engagement leg sections 52 into the rectangular hole 58 of the body panel 10 during reuse, even when the engagement leg sections 52 have undergone clip deformation and widened towards the outside in the male member 18 installed state.

Note that the present exemplary embodiments are only examples of embodiments, and obviously appropriate modifications are possible within a scope not departing from the spirit of the present invention. For example, whereas there are two each of the engagement leg sections 52 and the click leg sections 54 provided in the present exemplary embodiment, a single one of each may be provided.

The invention claimed is:

1. A clip comprising:
a male member having
a bar shaped axial portion, and
a head portion provided at one end portion of the axial portion, the head portion being larger than a profile of the axial portion; and
a female member having
an engagement leg body that extends from an inner edge portion of a ring-shaped flange that is contactable with the head portion, the engagement leg body configuring a portion of a hollow portion into which the axial portion is insertable, the engagement leg body resiliently deforming outwards when pressed by the axial portion, the engagement leg body not being formed with an engagement claw, and
a click leg body that configures the hollow portion together with the engagement leg body, and is formed with an engagement claw that engages with an engaging hole formed at the axial portion when the axial portion has pressed and expanded the engagement leg body,
wherein, when the engagement claw of the click leg body engages the engaging hole formed in the axial portion of the male member, the engagement leg body not being formed with an engagement claw contacts the male member and thus imparts a frictional force that restrain movement of the male member within the female member along the axial portion of the male member, and wherein a projecting portion is provided at an internal face of the engagement leg body, a leading end of the projecting portion being formed in a pointed shape that makes contact with an external face of the axial portion; and a guide rib is provided along an axial direction of the axial portion, and when the guide rib makes contact with the projecting portion, the guide rib is guided towards a base portion of the projecting portion.

2. The clip of claim 1, wherein the click leg body widens in diameter when the engagement claw is being engaged with the engaging hole, and the click leg body resiliently returns to an original state when the engagement claw has engaged with the engaging hole.

3. The clip of claim 1, wherein a sloping face that slopes along a circumferential direction is provided at a surface of the flange, and a sloping rib is provided at the head portion, the sloping rib being contactable with the sloping face.

4. A support member that supports an installation member for installation to a body panel, the support member comprising:

a hole portion formed in the support member;

an engagement leg body that extends from an inner edge portion at the hole portion, the engagement leg body configuring a portion of a hollow portion into which an axial body of a male member inserted into the hole portion and an attachment hole formed in the body panel is insertable, the engagement leg body resiliently deforming outwards when pressed by the axial body, the engagement leg body not being formed with an engagement claw; and a click leg body that configures the hollow portion together with the engagement leg body, and is formed with an engagement claw that engages with an engaging hole formed at the axial body when the axial body has pressed and expanded the engagement leg body; and a seat formed around a periphery of the hole portion, the seat receiving a head portion formed at an end portion of the axial body, wherein, when the engagement claw of the click leg body engages the engaging hole formed in the axial body of the male member, the engagement leg body not being formed with an engagement claw contacts the male member and thus imparts a frictional force that restrains movement of the male member within the female member along the axial body of the male member, and wherein a projecting portion is provided at an internal face of the engagement leg body, a leading end of the projecting portion being formed in a pointed shape that makes contact with an external face of an axial body; and a guide rib is provided along the axial direction of the axial body, and when the guide rib makes contact with the projecting portion, the guide rib is guided towards a base portion of the projecting portion.

5. The support member of claim 4, wherein the click leg body widens in diameter when the axial body is inserted, and when the engagement claw has engaged with the engaging hole, the click leg body resiliently returns to an original state.

6. The support member of claim 4, wherein a sloping face that slopes along a circumferential direction is provided at a surface of the seat, and a sloping rib is provided at the head portion, the sloping rib being contactable with the sloping face.

* * * * *